United States Patent [19]

Adachi

[11] Patent Number: 5,782,719

[45] Date of Patent: Jul. 21, 1998

[54] CVT CONTROL SYSTEM

[75] Inventor: Kazutaka Adachi, Yokohama, Japan

[73] Assignee: Nissan Motor Co., Ltd., Yokohama, Japan

[21] Appl. No.: 706,328

[22] Filed: Aug. 30, 1996

[30] Foreign Application Priority Data

Aug. 31, 1995 [JP] Japan .................. 7-245235

[51] Int. Cl.⁶ .................................. B60K 41/14
[52] U.S. Cl. .................................. 477/46; 477/44
[58] Field of Search .................. 477/37, 44, 46

[56] References Cited

U.S. PATENT DOCUMENTS

| | | | |
|---|---|---|---|
| 4,720,793 | 1/1988 | Watanabe et al. | 364/424.1 |
| 4,999,774 | 3/1991 | Tokoro et al. | 477/46 |
| 5,067,372 | 11/1991 | Suzuki | 477/46 |
| 5,439,424 | 8/1995 | Sawada et al. | 477/46 |
| 5,545,106 | 8/1996 | Senger et al. | 477/43 |
| 5,612,873 | 3/1997 | Ogawa | 477/46 |

FOREIGN PATENT DOCUMENTS 40 25 455  3/1991  Germany .

*Primary Examiner*—Charles A. Marmor
*Assistant Examiner*—Sherry Lynn Estremsky
*Attorney, Agent, or Firm*—Foley & Lardner

[57] ABSTRACT

A control system for an engine-CVT drivetrain conducts conversion of speed ratio command to displacement command of an input element of a ratio control mechanism of the CVT beyond limits of a predetermined displacement range that corresponds to a predetermined speed ratio window having, as a lower limit, a lowest speed ratio and, as an upper limit, a highest speed ratio, providing improved driveability upon moving from a standstill and improved fuel economy. The speed ratio command is given by subtracting a disturbance compensated speed ratio from a dynamic characteristic compensated speed ratio.

8 Claims, 17 Drawing Sheets

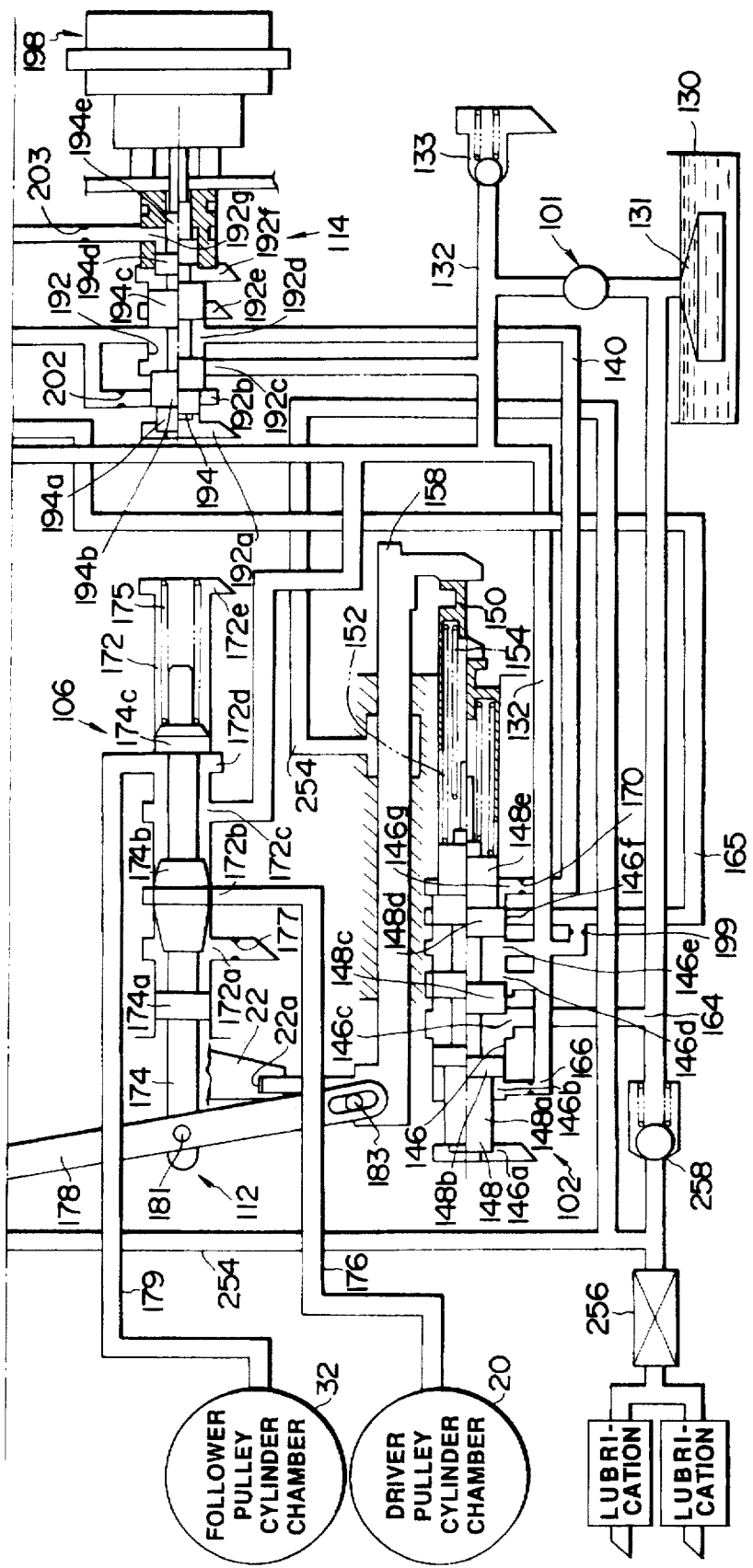

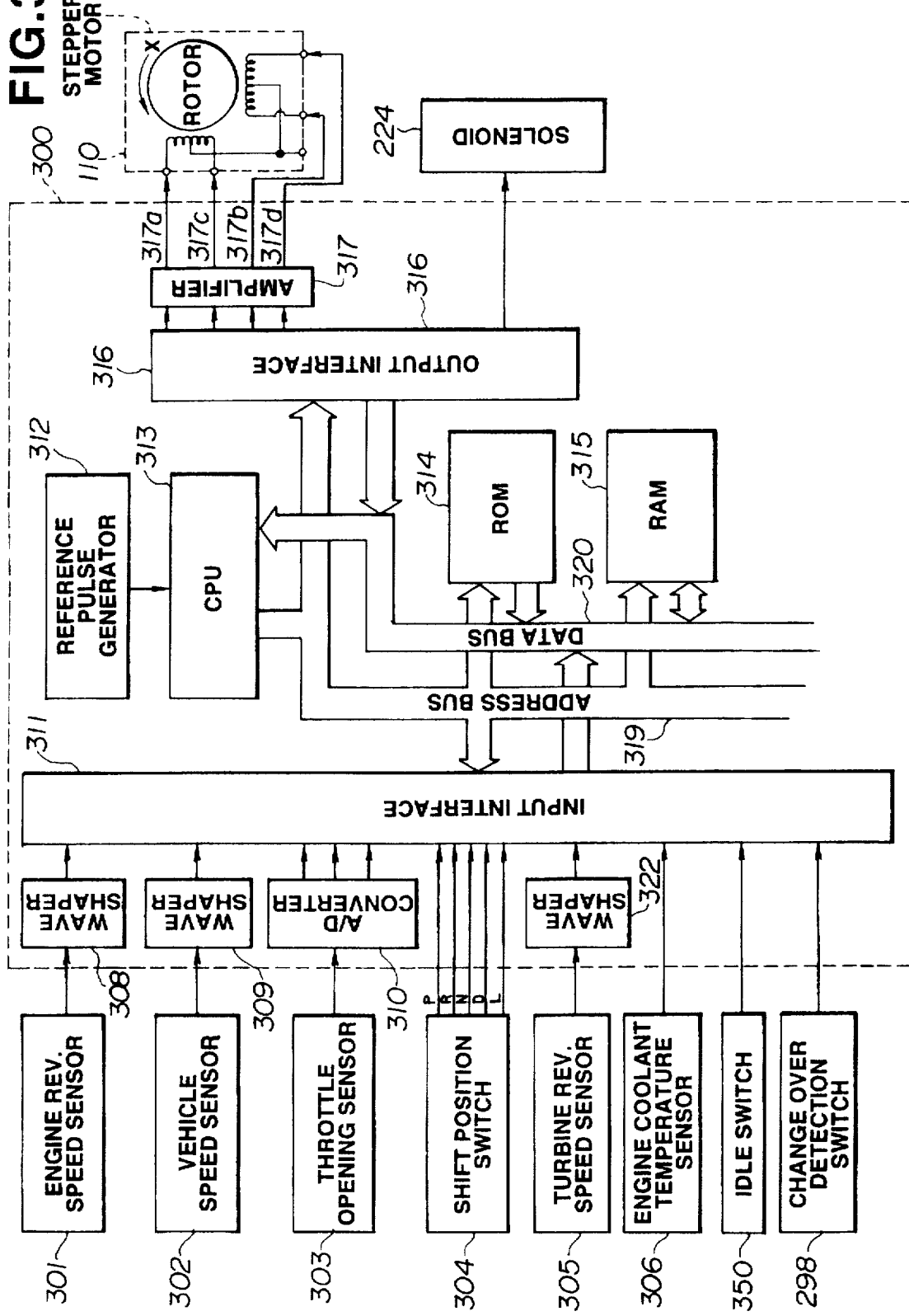

CVT CONTROL SYSTEM

BACKGROUND OF THE INVENTION

1. Field of the Invention

The present invention relates to a CVT control system which utilizes CVT ratio control.

2. Description of the Related Art

Continuously variable transmissions (CVT's) are transmissions that change ratio continously, not in discrete intervals. This continuous nature of CVT's gives them an infinite number of gear ratios, making them very attractive for automotive uses. One attractive aspect is that higher efficiency of the engine may result because it can be run at a desired speed for a broad range of vehicle speeds, allowing an efficient engine operating point for the specific power requirement.

Among various methods to control the ratio of the CVT, the most straight forward way is to define a target CVT ratio and then adjust the control valve of the CVT in a manner to achieve that ratio. In the CVT's of the type known from U.S. Pat. No. 5,439,424 and U.S. Pat. No. 5,067,372 (=DE-A 40 25 455), an actuator in the form of a stepper motor receives a control signal from a controller. Via a rack and pinion mechanism, the actuator can move an input element, in the form of a rod, of a ratio control mechanism. The actuator moves a lever connected to the input element. This lever is connected to the input element at one end and to a positionable pulley half of a driver pulley at the other end. At a point between the two ends, the lever is pivotably connected to a valve spool of a ratio or shift control valve. This arrangement provides position feedback of the pulley to the valve. As the actuator moves the lever, the valve in response to the movement of the valve spool alters the hydraulic pressure in hydraulic fluid line connected to the driver pulley. Hydraulic pressure from a regulator valve is supplied to this valve and also to a follower pulley drivingly connected via a V-belt to the driver pulley. As the pressure to the driver pulley is altered with the pressure to the follower pulley unaltered, pulley halves of the driver and follower pulleys move, changing the ratio of the CVT, i.e., a speed ratio of input to output shafts of the CVT. As the pulley half of the driver pulley moves, the lever moves repositioning the valve spool, providing a means for the valve to stop the positionable pulley halves from moving. There is no proportional relationship between the CVT ratio and the displacement of the input element although the CVT ratio alters continuously as the input element displaces.

In manufacturing the CVT's, there inevitably occurs product-to-product variability which leads to variation of the ratio response from one to another product. Even in a single product, the viscosity of hydraulic fluid, which varies with temperature, alters the ratio response. External disturbance, such as variation of engine torque transferred by the CVT and variation of the vehicle load transferred back to the engine by the CVT, also affects the ratio response.

In order to achieve a target ratio response desired, it is proposed in the commonly assigned co-pending U.S. patent application Ser. No. 08/637,069 filed on Apr. 24, 1996 by Kazutaka ADACHI et al., which corresponds to German Patent Application P 196 16 384.6 filed on Apr. 24, 1996, to carry out dynamic characteristic compensation and disturbance compensation.

According to this previously proposed CVT implementing the above proposal, a controller utilizes a conversion map in converting ratio command into the displacement of an input element of a ratio control mechanism and this map defines a relationship of the CVT ratio with the ratio command. Describing in detail, if there is determined a ratio command indicative of a predetermined highest CVT ratio that provides maximum or largest reduction ratio, the controller converts this ratio command, using this map, into a step number, namely $D_{SL}$, for a stepper motor used as an actuator for the input element, which step number is predetermined for the predetermined highest CVT ratio, while if there is determined a ratio command indicative of a predetermined lowest CVT ratio that provides minimum reduction ratio or overdrive, the controller converts this ratio command into a step number, namely $D_{SH}$, which is predetermined for the predetermined lowest CVT ratio. Using this conversin map, all of step numbers between the step numbers $D_{SH}$ and $D_{SL}$ are allocated to various CVT ratios between the predetermined highest and lowest CVT ratios, respectively. In this case, a ratio command indicative of a CVT ratio less than the predetermined lowest CVT ratio is converted into the step number $D_{SH}$ and a ratio command indicative of a CVT ratio greater than the predetermined highest CVT ratio is converted into the step number $D_{SL}$. The stepper motor changes its angular position in response to the control signal indicative of the step number resulting from the conversion using the map. Therefore, the input element moves over a predetermined stroke range having two limit positions defined by the step numbers $D_{SH}$ and $D_{SL}$, respectively, to establish various CVT ratios over a predetermined CVT ratio window having two limits defined by the predetermined highest and lowest CVT ratios, respectively. This works as long as there is no deviation in the relationship between the predetermined displacement range and the predetermined CVT ratio window.

However, a product-to-product variability of the CVT's inevitably yields initial deviation in this relationship, requiring fine and time consuming adjustment. The use of the stepper motor as the actuator causes deviation in this relationship if the stepper motor fails to take the appropriate angular position instructed by the control signal. In the case where a normally-off switch which is turned on during movement of the input element over an overstroke range beyond the limit position defined by the step number $D_{SL}$ is mounted, a deviation from an appropriate relationship of the switch with the input element may result owing to assembly error or rapid change in environmental temperature, causing the deviation in the relationship between the predetermined displacement range of the input element and the predetermined CVT ratio window. In the case where a highest CVT ratio established in the CVT is deviated in an upshift direction from the predetermined highest CVT ratio, the driveability is degraded upon moving the vehicle from a standstill. In the case where a lowest CVT ratio established in the CVT is deviated in a downshift direction from the predetermined lowest CVT ratio, the fuel economy becomes poor.

What is desirable in ratio control of an engine-CVT drivetrain is quick and smooth reduction of deviation, if any or if occurred, in the relationship between the predetermined displacement range of the input element of a ratio control means and the predetermined CVT ratio window.

An object of the present invention is to provide an engine-CVT drivetrain control system which conducts quick and smooth reduction of such a deviation in the relationship between the predetermined displacement range of the input element of a ratio control means and the predetermined CVT ratio window.

SUMMARY OF THE INVENTION

The invention uses the improved controller which converts a CVT or speed ratio command into a corresponding one of different displacement commands of an input element of a ratio control means which spread continuously over and beyond a predetermined displacement range of the input element which range corresponds to a predetermined CVT or speed ratio window. The input element of the ratio control means is then positioned in response to a control signal in a manner determined as a function of the displacement command.

According to the most preferred implementation of the invention, the improved controller generates a target speed ratio command;

the controller generates an actual speed ratio;

the controller derives an actual CVT dynamic characteristic constant of dynamic characteristic of the CVT for the actual speed ratio;

the controller derives a target CVT dynamic characteristic constant of a target dynamic characteristic of the CVT;

the controller determines a speed ratio command in response to the target speed ratio command, the actual speed ratio, the actual CVT dynamic characteristic constant and the target CVT dynamic characteristic constant;

the controller converts the speed ratio command into a corresponding one of different displacement commands of an input element of a ratio control means which spread continuously over and beyond a predetermined displacement range of the input element which range corresponds to the predetermined speed ratio window; and the controller develops a control signal in a manner determined as a function of the displacement command. The input element is positionable in response to the control signal to establish various speed ratios between input and output shafts of the CVT over the predetermined sped ratio window.

In the improved controller, a disturbance compensated speed ratio is subtracted from a dynamic characteristic compensated speed ratio to give the speed ratio command.

The controller compares the speed ratio command ($i_P$) with the predetermined speed ratio window;

the controller converts the speed ratio command ($i_P$) to a corresponding one of the different displacement commands ($D_S$) of which the predetermined displacement range consists when the comparison indicates that the speed ratio command ($i_P$) falls in the predetermined speed ratio window;

the controller determines a displacement command ($D_S$) which is expressed as $$D_S = D_{SH} + (i_P - i_{PL}) \times (D_{SH} - D_{SH-1})/(i_{PL} - i_{PL-1})$$

where:

$D_S$ is displacement command;

$i_{PL}$ is lowest speed ratio command indicative of the lowest speed ratio;

$D_{SH}$ is displacement command corresponding to the lowest speed ratio command $i_{PL}$;

$i_{PL-1}$ is a speed ratio command less than $i_{PL}$;

$D_{SH-1}$ is displacement command corresponding to the speed ratio $i_{PL-1}$ when the speed ratio ($i_P$) is less than the lowest speed ratio command ($i_{PL}$); and the controller determines a displacement command which is expressed as $$D_S = D_{SL} + (i_{PA} - i_{PH}) \times (D_{SL} - D_{SL-1})/(i_{PH} - i_{PH-1})$$

where:

$i_{PH}$ is higest speed ratio command indicative of the highest speed ratio;

$D_{SL}$ is displacement command corresponding to the highest speed ratio command $i_{PH}$;

$i_{PH-1}$ is a speed ratio command greater than $i_{PH}$;

$D_{SL-1}$ is displacement command corresponding to the speed ratio command $i_{PH-1}$ when the speed ratio command ($i_P$) is greater than the highest speed raio command ($i_{PH}$).

The controller calculates a dynamic characteristic compensated speed ratio ($i_{PA}$) which is expressed as $$i_{PA} = [\{T_P(i_{PR})s+1\}/\{T_T s+1\}]i_{PT}$$

where:

$T_P(i_{PR})$ is the actual CVT dynamic characteristic constant in the form of time constant;

s is complex variable of Laplace transform;

$T_T$ is the target CVT dynamic characteristic constant in the form of time constant; and $i_{PT}$ is the target speed ratio command;

the controller restrains the dynamic characteristic compensated speed ratio ($i_{PA}$) by the lower and upper limits which are defined by the following inequaility;

$$i_{PL} \leq i_{PA} \leq i_{PH}.$$

the controller calculates a disturbance compensated speed ratio $i_{PD}$ which is expressed as $$i_{PD} = [\{T_H(i_{PR})s + 1\}/\{T_P(i_{PR})s + 1\}]i_{PR} - [1/\{T_H(i_{PR})s + 1\}]e^{-Ls}i_P$$

where:

$T_H(i_{PR})$ is cutoff frequency of low-pass filter; and

L is deadtime; and the controller subtracts the disturbance compensated speed ratio $i_{PD}$ from the restraied dynamic characteristic compensated speed ratio $i_{PA}$ to give the speed ratio command $i_P$.

BRIEF DESCRIPTION OF THE DRAWINGS

FIGS. 2A and 2B, when combined, are a hydraulic circuit of a hydraulic control system;

FIG. 3 is a block diagram of a CVT controller;

DETAILED DESCRIPTION OF THE INVENTION

In the following description, the term "a CVT ratio or a speed ratio" is hereby defined as and used to mean a speed ratio of input to output shafts of a CVT.

Figure 1:
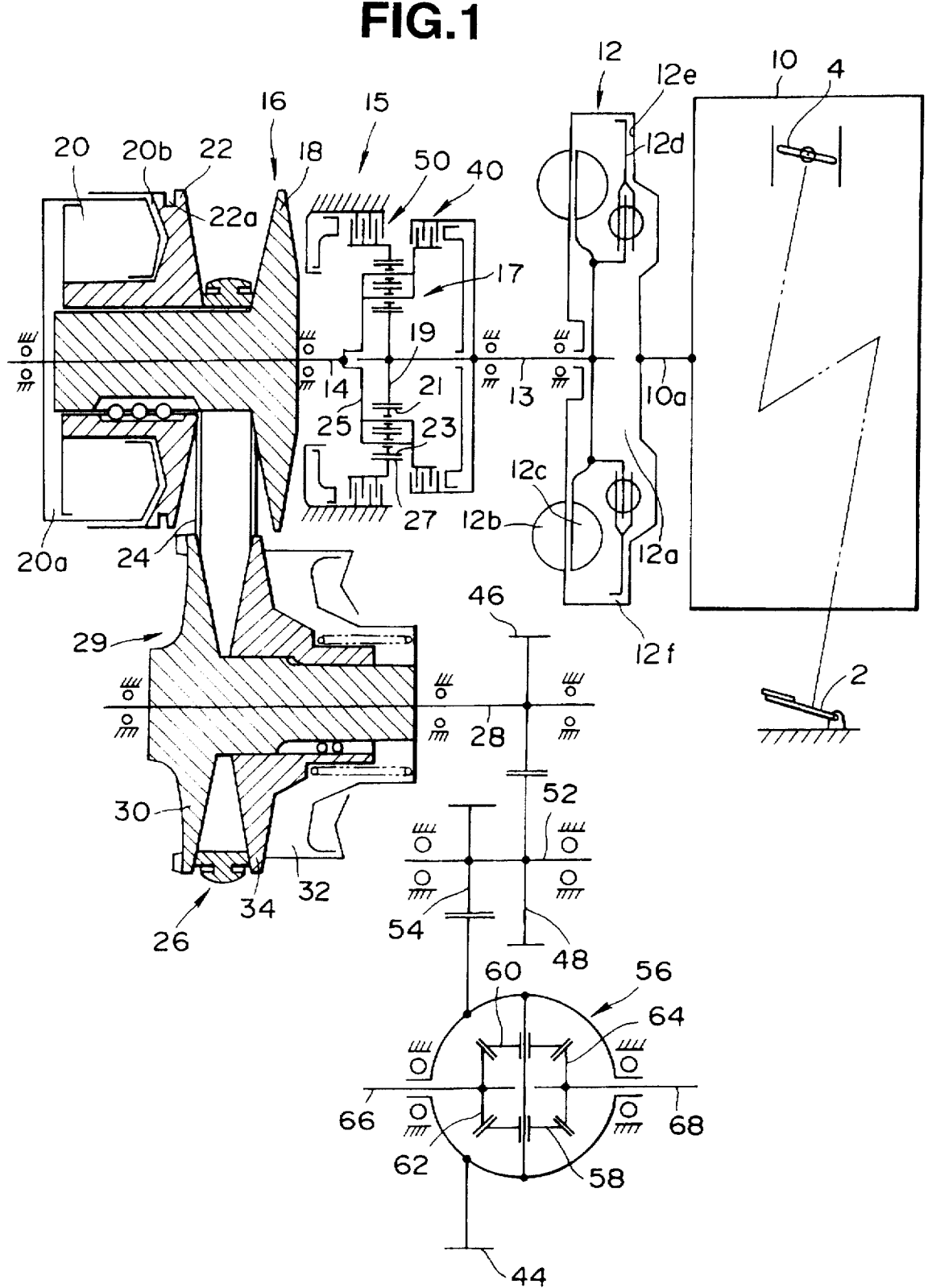
FIG. 1 is a schematic view of a continuously variable transmission (CVT) incorporated in a transaxle drivingly connected to an engine.

Referring to FIG. 1, a block 10 represents an engine. The engine 10 has a throttle 4 which opens in degrees in response to depressed position of a gas pedal 2. The engine 10 is drivingly connected to a hydrokinetic torque transmitting unit in the form of a fluid coupling 12. The fluid coupling 12 is drivingly connected to a continuously variable transmission (CVT) 29. The CVT 29 is drivingly connected to a final drive 56. The CVT 29 includes a driver pulley 16, a follower pulley 26 and a V-belt 24. It will be understood that the present invention is not limited to the use of CVT's with pulley V-belt power transfer. The present invention is operational with any other type of CVT in which the ratio can be controlled, including traction drive type CVT's.

In FIG. 1, the engine output shaft 10$a$ is connected to the hydrokinetic torque transmitting unit in the form of the fluid coupling 12. If desired, the fluid coupling 12 may be replaced with a torque converter. Alternatively, an electromagnetic clutch may be used. The fluid coupling 12 has a lock-up mechanism including a clutch element 12$d$ which divides the inside of the fluid coupling 12 into two chambers, including a lock-up chamber 12$a$, on the opposite sides thereof. The fluid coupling 12 has an input element in the form of a pump impeller 12$b$ fixedly coupled with the engine output shaft 10$a$ and an output element in the form of a turbine runner 12$b$ fixedly coupled with a turbine shaft 12 for rotation therewith. It will be understood that the turbine shaft 13 serves as an input shaft of the CVT 29.

The turbine shaft 13 is coupled with a forward reverse changeover mechanism 15. This mechanism 15 includes a planetary gearing 19, a forward clutch 40 and a reverse brake 50. The mechanism 15 is coupled at its output element with a driver shaft 14 coaxially arranged in line with the turbine shaft 13. Mounted on the driver shaft 14 is the driver pulley 16 of the CVT 29.

The driver pulley 16 includes a pulley half 18 fixed to the driver shaft 14 and an axially positionable pulley half 22 which is arranged in opposed relation with the pulley half 18 to define therewith a pulley groove. The pulley half 22 is axially movable along an axis of rotation of the driver shaft 14 in response to hydraulic pressure within a driver pulley cylinder chamber 20. The driver pulley cylinder 20 includes two chambers 20$a$ and 20$b$ and has a pressure acting area larger than that of a follower pulley cylinder chamber 32.

The follower pulley 26 is mounted to a follower or driven shaft 28. This pulley 26 includes a pulley half 30 fixed to the follower shaft 28 for rotation therewith and a positionable pulley half 34 which is arranged in opposed relation with the pulley half 30 to define therewith a pulley groove and axially movable along an axis of rotation of the follower shaft 28 in response to hydraulic pressure within the follower pulley cylinder chamber 32. It will be understood that the follower shaft 28 serves as an output shaft of the CVT 29.

The follower shaft 28 has fixedly coupled therewith a driver gear 46 which meshes with an idler gear 48 fixedly coupled with an idler shaft 52. The idler shaft 52 has fixedly coupled therewith a pinion 54 which meshes with a final gear 44 of the final drive 56 in the form of a differential unit.

Torque of the engine 10 is transmitted via the fluid coupling 12 and turbine shaft 13 to the forward reverse changeover mechanism 15. Engagement of the forward clutch 40 with the reverse brake 50 disengaged or released causes the planetary gearing 17 to rotate as a unit to bear transmission of the torque to the driver shaft 14 of the CVT 29 with the direction of rotation unchanged. Disengagement or release of the forward clutch 40 with the reverse brake 50 applied causes the planetary gearing 17 to conduct differential action to bear transmission of the torque to the driver shaft 14 with the direction of rotation reversed.

The torque as transmitted to the driver shaft 14 is transmitted via the driver pulley 16, V-belt 24, follower pulley 26, follower shaft 28, driver gear 46, idler gear 48, idler shaft 52, pinion 54 and final gear 44 to the differential unit 56. When both forward clutch 40 and reverse brake 50 are disengaged, the drivetrain including the CVT 29 stays in neutral.

The CVT or speed ratio of the CVT 29 changes by axially moving the pulley half 22 of the driver pulley 16. This alters a radius of curvature at which the V-belt 24 frictionally contacts with the pulley groove walls of the driver pulley 16. Then, the V-belt 24 tensioned between the driver and follower pulleys 16 and 26 causes the pulley half 34 of the follower pulley 26 to move axially.

Figure 2A:
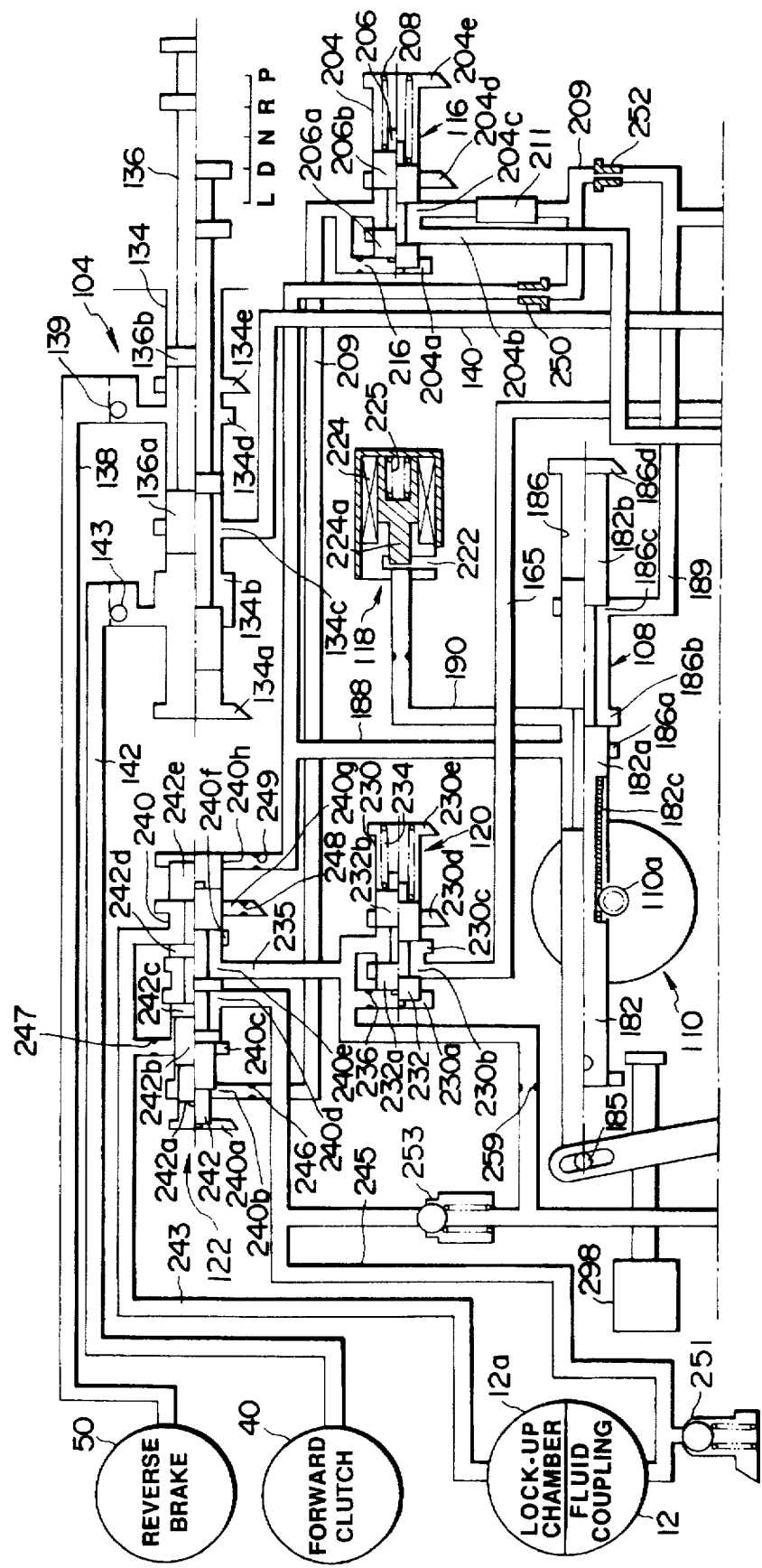

Referring to FIGS. 2A and 2B, a hydraulic control system includes a manual selector valve 104 manually operable by the vehicle operator to any one of desired positions (e.g., L, D, N, R, P), an actuator in the form of a stepper motor 110, an input element of a ratio control mechanism 112. This input element is in the form of a rod or spool 182 of a ratio or shift command valve 108. The rod 182 is connected by rack and pinion to the stepper motor 110. The stepper motor 110 is under the control of a controller 300. The input element 182 is postionable in response to a control signal developed by the controller 300.

Referring to FIG. 3, the speed (Ni) of the input shaft of the CVT 29 is sensed by a turbine speed sensor 305 arranged to detect the speed of the turbine shaft 13, while the speed (No) of the output shaft of the CVT 29 is sensed by a vehicle speed sensor 302 arranged to detect the speed of the follower shaft 28. The output of the vehicle speed sensor 302 is used to derive information of the vehicle speed. In addition to the turbine and vehicle speed sensors 303 and 302, there are an engine speed sensor 301, a throttle opening sensor 303, a shift position switch 304, an engine coolant temperature sensor 305, a changeover detection switch 298 and an idle switch 350.

Output signals of the various sensors and switches are input to the controller 300. The controller 300 includes an input interface 311, a reference pulse generator 312, a central processing unit (CPU) 313, a read only memory (ROM) 314, a random access memory (RAM) 315 and an output interface 316. They are interconnected via an address bus 319 and a data bus 320. The above-mentioned output signals are directly or via wave shapers 308, 309 and 322 or via an analog to digital (A/D) converter 310 to the input interface 311. The controller 300 outputs a control signal. The control signal is applied to a driver circuit for the stepper motor 110. Specifically, in response to the signals from the various sensors and switches, the controller 300 determines and outputs a pulse mumber as the control signal. Application of the control signal to the driver circuit causes the stepper motor 110 to turn, thus moving the input element 182.

Referring again to FIGS. 2A and 2B, in response to the control signal, the stepper motor 110 moves the input element 182 of the ratio control mechanism 112. The input element 182 moves a level 170. The lever 178 is pivotably connected to the input element 182 at one end and to the positionable pulley half 22 of the driver pulley 16 at the other end. At a point between the two ends, the lever 178 is pivotably connected to a valve spool 174 of a shift control valve 106. This arrangement provides position feedback of the pulley 16 to the valve 106. As the stepper motor 110 moves the lever 178, the shift control valve 106, in response to the movement of the valve spool 174, alters the hydraulic pressure in a hydraulic line 176 connected to the driver pulley cylinder chamber 20. The hydraulic pressure in a hydraulic line 179 connected to the follower pulley cylinder chamber 32 is unaltered and kept as high as the hydraulic pressure generated by a line pressure regulator 102. As the hydraulic pressure in the hydraulic line 176 is altered, the pulley half 22 moves. Movement of the pulley half 22 causes the V-belt 24 to move the pulley half 34 of the follower pulley 26. This causes the speed ratio (Ni/No) of the CVT 29 to change. As the pulley half 22 moves, the lever 178 moves, repositioning the valve spool 174, providing a means for the valve 106 to stop the positionable pulley halves 22 and 34 from moving.

Detailed description of FIGS. 1, 2A, 2B and 3 is found in the before-mentioned U.S. Pat. No. 5,067,372 issued on Nov. 26, 1991 in the name of Suzuki and assigned to the common assignee to which the present application is to be assigned, which patent is hereby incorporated by reference in its entirety. For further understanding, reference is made to this patent. This U.S. patent corresponds to DE-A 40 25 455.

The implementation of the present invention into the above described hardware will be further explained below.

Figure 4:
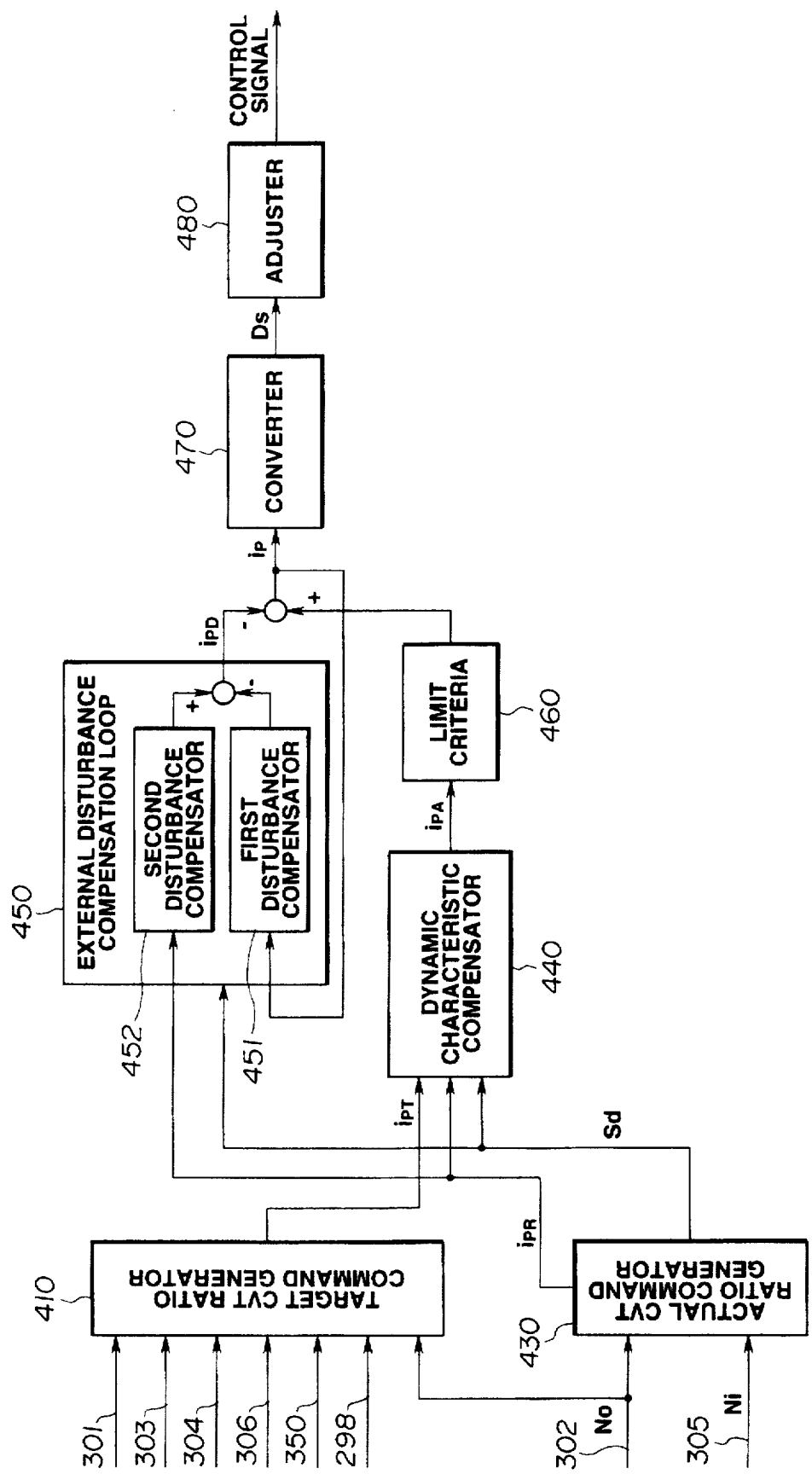
FIG. 4 is a control diagram showing ratio control involving disturbance compensation and dynamic characteristic compensation.

Referring to FIG. 4, a box 410 represents a target CVT ratio command generator and a box 430 represents an actual CVT ratio command generator. Pieces of information carried by the outputs of the engine speed sensor 301, throttle position sensor 303, shift position switch 302, engine coolant temperature sensor 305, idle switch 350, changeover switch 298 and vehicle speed sensor 302 are input to the target CVT ratio command generator 410. This command generator 410 determines a target CVT ratio based on the input information and generates a target CVT or speed ratio command $i_{PT}$ indicative of the determined target CVT ratio.

Information as to speed Ni of the input shaft of the CVT 29 and information as to the speed No of the output shaft of the CVT 29, which are carried by the outputs of the turbine speed sensor 305 and vehicle speed sensor 302, are input to the actual CVT ratio command generator 430. The actual CVT ratio command generator 430 determines the CVT or speed ratio Ni/No and generates an actual CVT or speed ratio signal $i_{PR}$ indicative of the determined actual CVT ratio. Based on result of comparison between newly determined actual CVT ratio and previously determined old actual CVT ratio, the actual CVT ratio generator 430 determines whether the actual CVT is shifting in upshift direction or in downshift direction and outputs a shift direction signal Sd indicative of the determined direction.

The shift direction signal Sd is input to a dynamic characteristic compensator 440 and also to an external disturbance compensation loop 450 including a first disturbance compensator 451 and a second disturbance compensator 452. The actual CVT ratio command $i_{PR}$ is input to the dynamic characteristic compensator 440 and also to the second disturbance compensator 452. The target CVT ratio command $i_{PT}$ is input to the dynamic characteristic compensator 440.

The dynamic characteristic compensator 440 outputs dynamic characteristic compensated speed ratio $i_{PA}$. The dynamic characteristic compensated speed ratio $i_{PA}$ is limited by a limit function in a box 460. The dynamic characteristic compensated speed ratio $i_{PA}$ is then output to a summation point. The external disturbance compensation loop 450 outputs disturbance compensated speed ratio $i_{PD}$ to the summation point. At this summation point, the disturbance compensated speed ratio $i_{PD}$ is subtracted from the dynamic characteristic compensated speed ratio $i_{PA}$ to output a speed ratio command $i_P$. The speed ratio command $i_P$ is input to a converter 470. The converter 470 generates a displacement command $D_S$ of the input element 182 in terms of a step number defining an angular position of the stepper motor 110 as a function of the input speed ratio command $i_P$. The converter 470 may include a two-dimensional look-up table in a computer memory. The displacement command $D_S$ in terms of the angular position of the stepper motor $\theta$ is input to an adjuster 480. The adjuster 480 generates adjusted step number as the control signal applied to the stepper motor 110.

Figure 5:
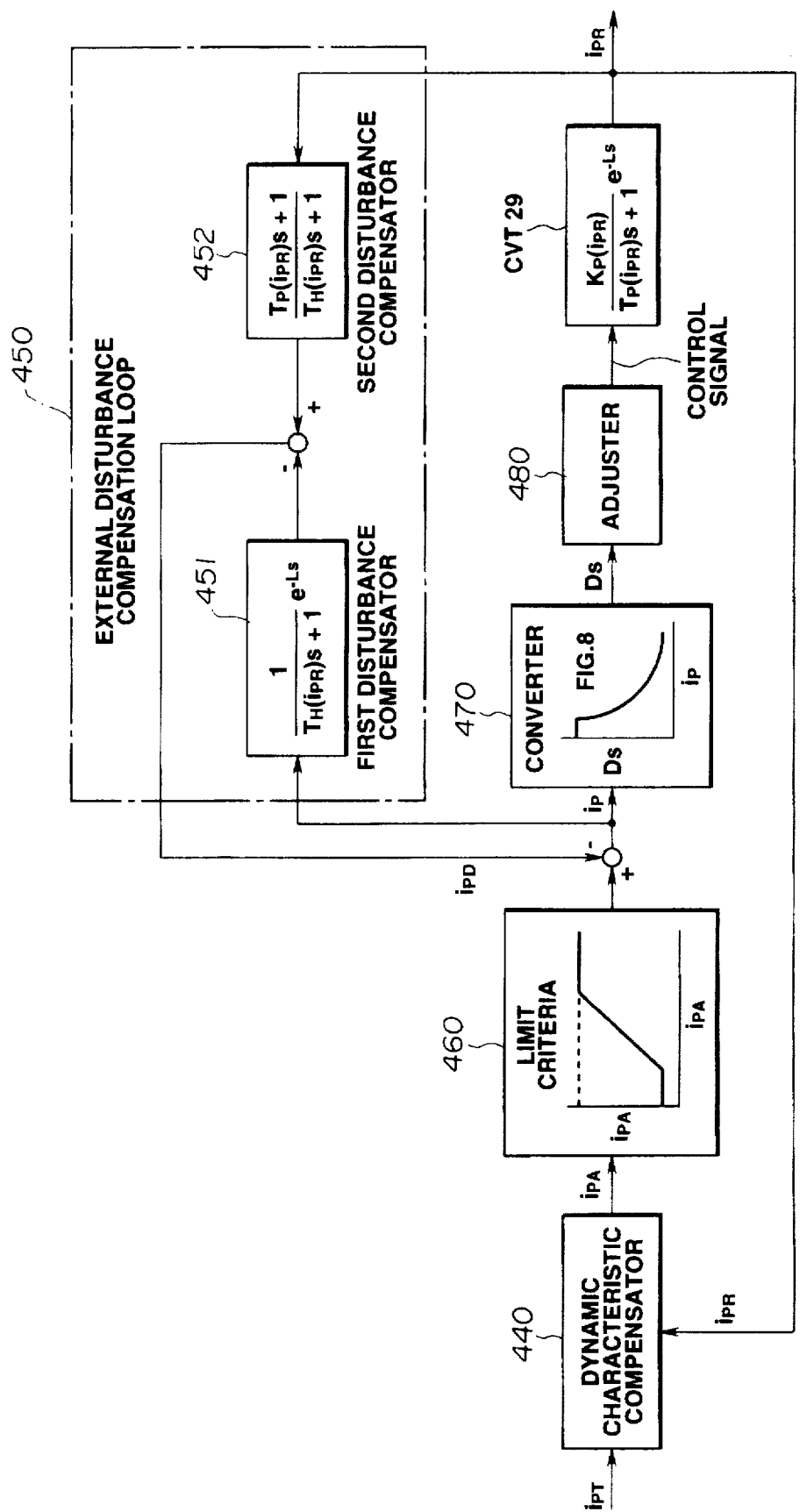
FIG. 5 is a block diagram illustrating the structure of the robust control.

The preferred implementation of the present invention can be understood with reference to the block diagram in FIG. 5.

Dynamic characteristic Gp(s) of the CVT 29 can be expressed as, $$G_P(s) = \{\{K_P(i_{PR})\}/\{T_P(i_{PR})s+1\}\}e^{-Ls} \quad (1)$$

where:

$K_P(i_{PR})$ is a gain of the CVT;

$T_P(i_{PR})$ is an actual dynamic characteristic constant in the form of a time constant;

L is deadtime; and s is complex variable of Laplace transform.

Figure 6:
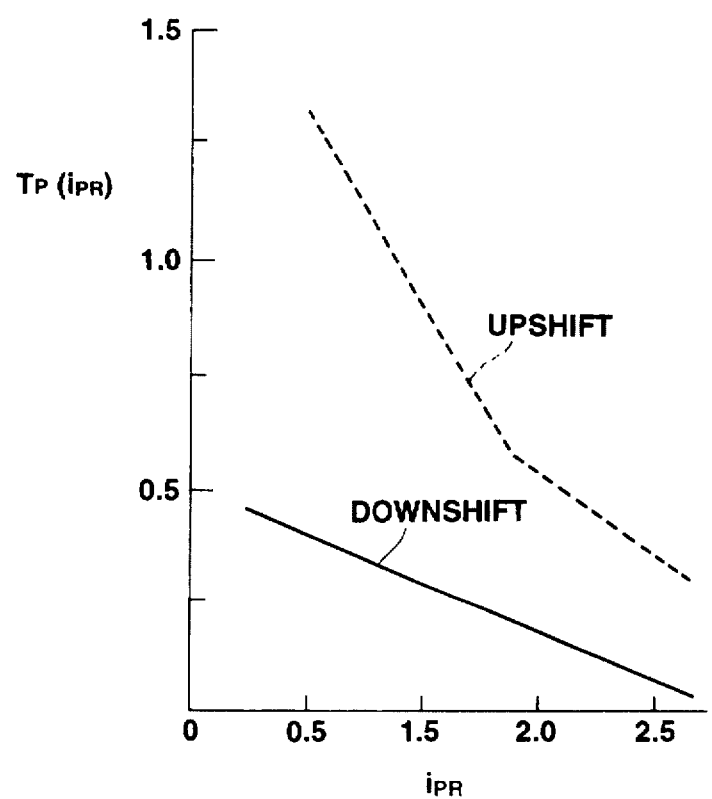
FIG. 6 is a graphical representation of time constant $T_P(i_{PR})$ of CVT.
Figure 8:
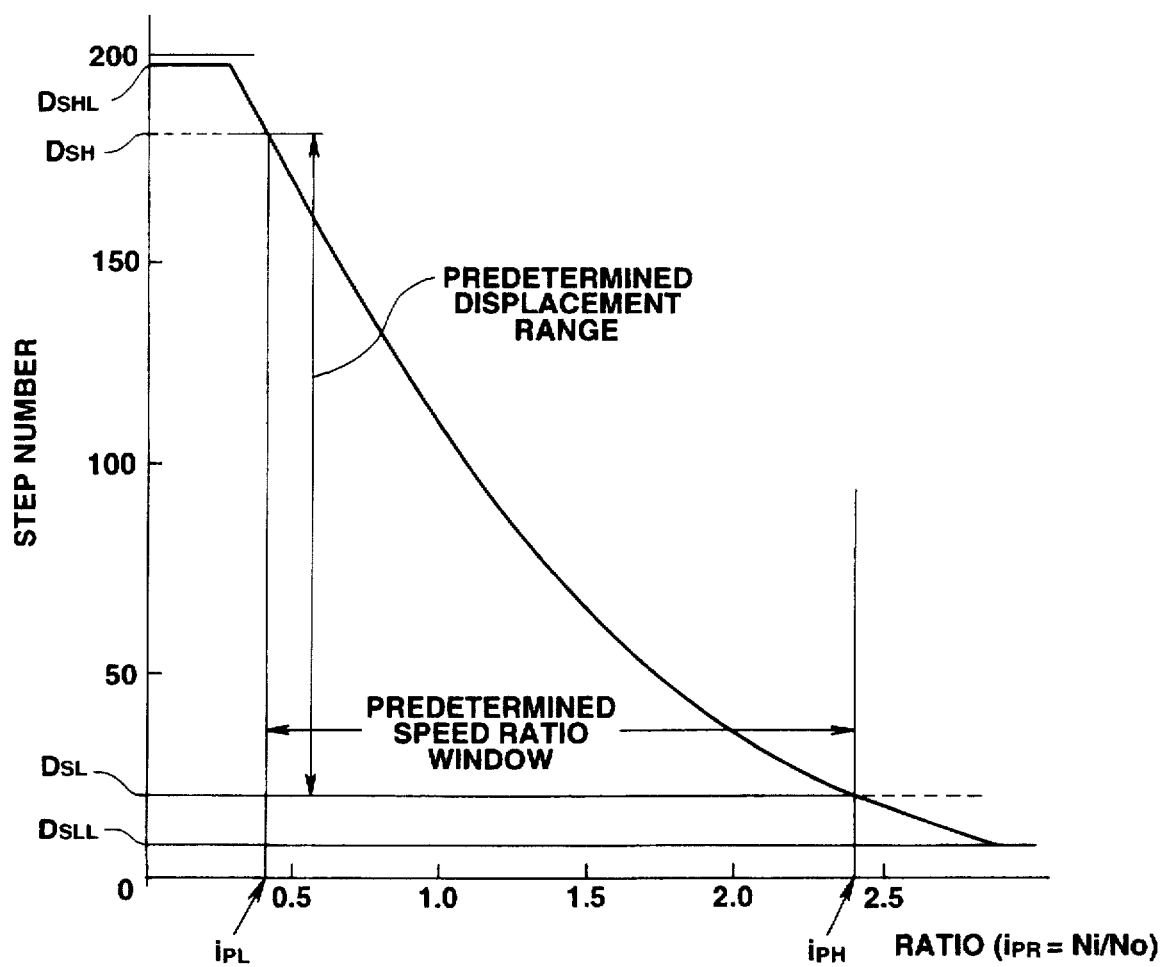
FIG. 8 illustrates a conversion map used in the control system (fully drawn line) in comparison with a conversion map of the previously proposed CVT (broken line) discussed before.

As shown in FIG. 8, the CVT ratio $i_{PR}$ is not proportional to the displacement of the input element 182, i.e., the angular position of the stepper motor 110. As shown in FIG. 6, the fully drawn line illustrates variation of time constant $T_P(i_{PR})$ against varying CVT ratio $i_{PR}$ when the shift direction signal Sd indicates that the CVT ratio $i_{PR}$ changes in downshift direction, while the broken line illustrates variation of time constant $T_P(i_{PR})$ against varying CVT ratio when the shift direction signal Sd indicates that the CVT ratio $i_{PR}$ changes in upshift direction. Thus, the time constant $T_P(i_{PR})$ varies as a first function of the CVT ratio for upshift and as a second function of the CVT ratio for downshift directions.

At the dynamic characteristic compensator 440, the dynamic characteristic constant in the form of time constant $T_P(i_{PR})$ of the dynamic characteristic $G_P(s)$ is derived by, for example, performing a table look-up operation of FIG. 6 using the actual CVT ratio $i_{PR}$ and shift direction signal Sd. Also derived is a target dynamic characteristic constant i the form of time constant $T_T$ of a target dynamic characteristic $G_T(s)$ of the CVT which is expressed as $$G_T(s) = \{1/(T_T s+1)\}e^{-Ls} \quad (2).$$

Then, the dynamic characteristic compensator 440 determines and outputs a dynamic characteristic compensated CVT or speed ratio $i_{PA}$ which is expressed as $$i_{PA} = \{\{T_P(i_{PR})s+1\}/\{T_T s+1\}\}i_{PT} \quad (3).$$

Preferrably, the dynamic characteristic compensated speed ratio $i_{PA}$ is restrained or limited at the box 460 by the following inequality:

$$i_{PL} \leq i_{PA} \leq i_{PH} \quad (4)$$

where:

$i_{PL}$ is a highest CVT ratio; and $i_{PH}$ is a lowest CVT ratio.

A disturbance compenated speed ratio $i_{PD}$, which will be explained later, is subtracted from the dynamic characteristic compensated speed ratio $i_{PA}$ at a summation point to give as an output a speed ratio command $i_P$. The speed ratio command $i_P$ is expressed as $$i_P = i_{PA} - i_{PD} \quad (5)$$

Ths speed ratio command $i_P$ and actual speed ratio $i_{PR}$ are input to the external disturbance compensation loop 450. This loop 450 includes a first disturbance compensator 451 and a second disturbance compensator 452 and outputs the external disturbance compensated speed ratio $i_{PD}$ which is expressed as $$i_{PD} = \{\{T_P(i_{PR})s + 1\}/\{T_H(i_{PR})s + 1\}\}i_{PR} - [1/\{T_H(i_{PR})s + 1\}]\,e^{-Ls}i_P \quad (6)$$

where:

$T_H(i_{PR})$ is a cutoff frequency of low-pass filter of the external disturbance compensator.

Figure 7:
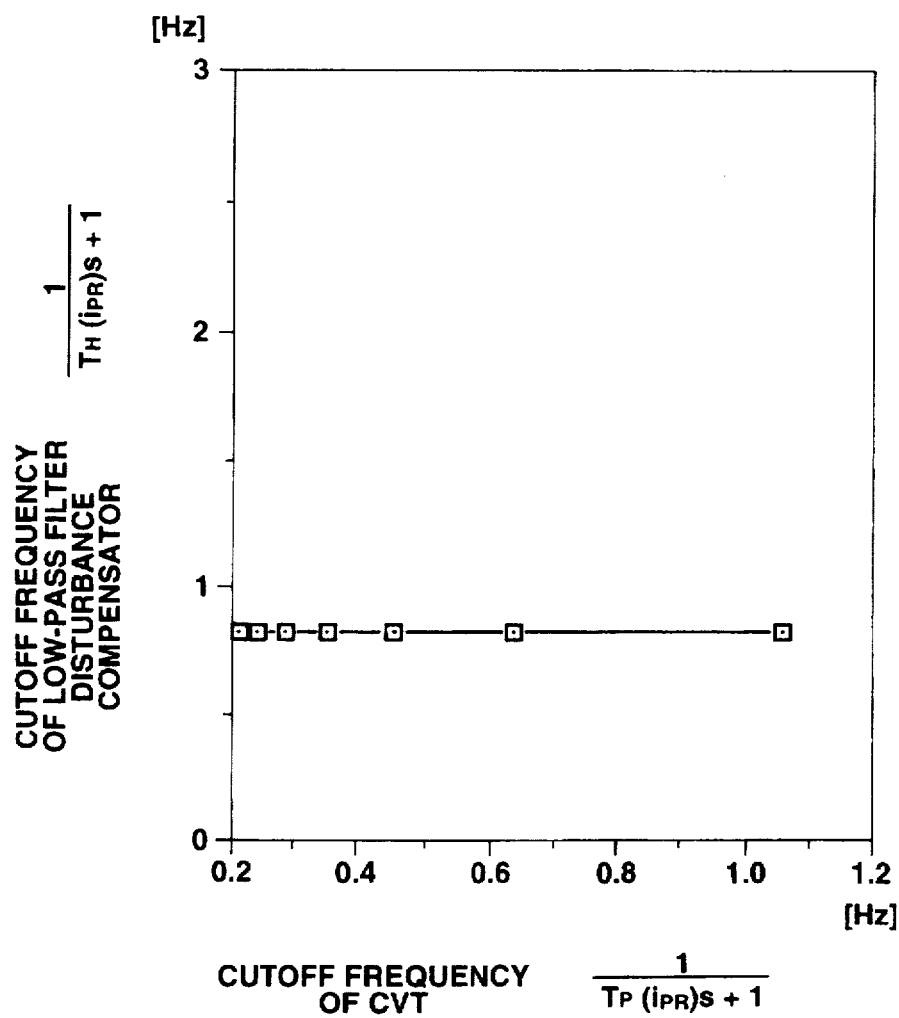
FIG. 7 is a graphical representation of relationship between cutoff frequency of low-pass filter of disturbance compensator versus cutoff frequency of low-pass filter of dynamic characteristic compensator.

As shown in FIG. 7, the cutoff frequency of low-pass filter of the external compensator is determined such that the dynamic characteristic (time constant, deadtime) of the CVT 29 and the stability thereof (in this embodiment, a gain greater than 12 dB, an angular phase allowance greater than 45°) are optimized. In the process at the external disturbance compensation loop 450, the dynamic characteristic $G_P(s)$ is used as a model of the CVT 29, and any possible deviation from this model due to manufacturing variability (parameter variations) and external disturbance is eliminated.

As explained before, the CVT ratio command $i_P$ is given by subtracting the disturbance compensated CVT ratio from the dynamic characteristic compensated CVT ratio $i_{PA}$. Using this CVT ratio command $i_P$, the desired response which is least influenced by parameter variations and the external disturbance is established.

The CVT ratio command $i_P$ is input to the converter 470. The converter 470 involves a two-dimensional table as illustrated by the fully drawn line in FIG. 8 and determines and output a displacement command $D_S$ of the input element 182 in terms of the corresponding angular position $\theta$ of the stepper motor 110.

Referring to FIG. 8, the horizontal axis represents the CVT ratio, while the vertical axis represents the displacement of the input element 182 in terms of step number applied to the stepper motor 110. On the horizontal axis, the highest CVT ratio $i_{PH}$ and the lowest CVT ratio $i_{PL}$ are indicated. The the predetermined speed or CVT ratio window, which is limited by the lowest and highest CVT ratios $i_{PL}$ and $i_{PH}$, is indicated by two heads arrow. On the vertical axis, step number corresponding to the highest CVT ratio $i_{PH}$ is indicated by $D_{SL}$ and step number corresponding to the lowest CVT ratio $i_{PL}$ is indicated by $D_{SH}$. The predetermined displacement range which corresponds to the predetermined speed ratio window is indicated by two heads arrow. In FIG. 8, the conversion map used in the previously proposed CVT discussed before is illustrated by the broken line. This conversion map and the conversion map used in the CVT of the present invention are common over the predetermined displacement range. A difference is that the conversion map used in the invention extends beyond the predetermined displacement range which corresponds to the predetermined CVT ratio window defined by $i_{PL}$ and $i_{PH}$. In other words, the effective displacement range extends beyond $D_{SL}$ to a lower displacement command limit $D_{SLL}$ on one hand, and beyond $D_{SH}$ to upper displacement command limit $D_{SHL}$ on the other hand. The upper displacement command limit $D_{SHL}$ is greater than the displacement command $D_{SH}$ interms of pulse number. The lower displacement command limit $D_{SLL}$ is less than the displacement command $D_{SH}$ in terms of pulse number.

Conversion at the converter 470 can be understood with the following description with reference to FIG. 8.

The speed ratio command $i_P$ is compared with the predetermined speed ratio window.

When the result of this comparison indicates that the speed ratio command $i_P$ falls in the predetermined speed ratio command, the speed ratio command $i_P$ is converted to a corresponding one of the different displacement commands $D_S$ of which the predetermined displacement range consists when the comparison indicates that the speed ratio command ($i_P$) falls in the predetermined speed ratio window.

When the speed ratio command $i_P$ is less than the lowest speed ratio $i_{PL}$, the converter 470 determines a displacement command $D_S$ which is expressed as $$D_S = D_{SH} + (i_P - i_{PL}) \times (D_{SH} - D_{SH-1})/(i_{PL} - i_{PL-1}) \quad (7)$$

where:

$D_S$ is displacement command;

$i_{PL}$ is lowest speed ratio command indicative of the lowest speed ratio;

$D_{SH}$ is displacement command corresponding to the lowest speed ratio command $i_{PL}$;

$i_{PL-1}$ is a speed ratio command less than $i_{PL}$;

$D_{SH-1}$ is displacement command corresponding to the speed ratio command $i_{PL-1}$.

When the speed ratio command $i_P$ is greater than the highest speed ratio $i_{PH}$, the converter 470 determines a displacement command $D_S$ which is expressed as $$D_S = D_{SL} - (i_P - i_{PH}) \times (D_{SL} - D_{SL-1})/(i_{PH} - i_{PH-1}) \quad (8)$$

where:

$i_{PH}$ is highest speed ratio command indicative of the highest speed ratio;

$D_{SL}$ is displacement command corresponding to the highest speed ratio command $i_{PH}$;

$i_{PH1-1}$ is a speed ratio command greater than the highest speed ratio command $i_{PH}$;

$D_{SL-1}$ is displacement command corresponding to the speed ratio command $i_{PH-1}$.

When the displacement command $D_S$ is less than the lower displacement command limit $D_{SLL}$, the converter 470 sets the displacement command $D_S$ equal to the lower displacement command limit $D_{SLL}$.

When the displacement command $D_S$ is greater than the upper displacement command limit $D_{SHL}$, the converter 470 sets the displacement command $D_S$ equal to the upper displacement command limit $D_{SHL}$.

The converter 470 outputs the displacement command $D_S$ of the input element 182 in terms of step number applied to the stepper motor 110. This command is input to the adjuster 480. The adjuster 480 outputs a control signal. This control signal is applied to the stepper motor 110.

Figure 9:
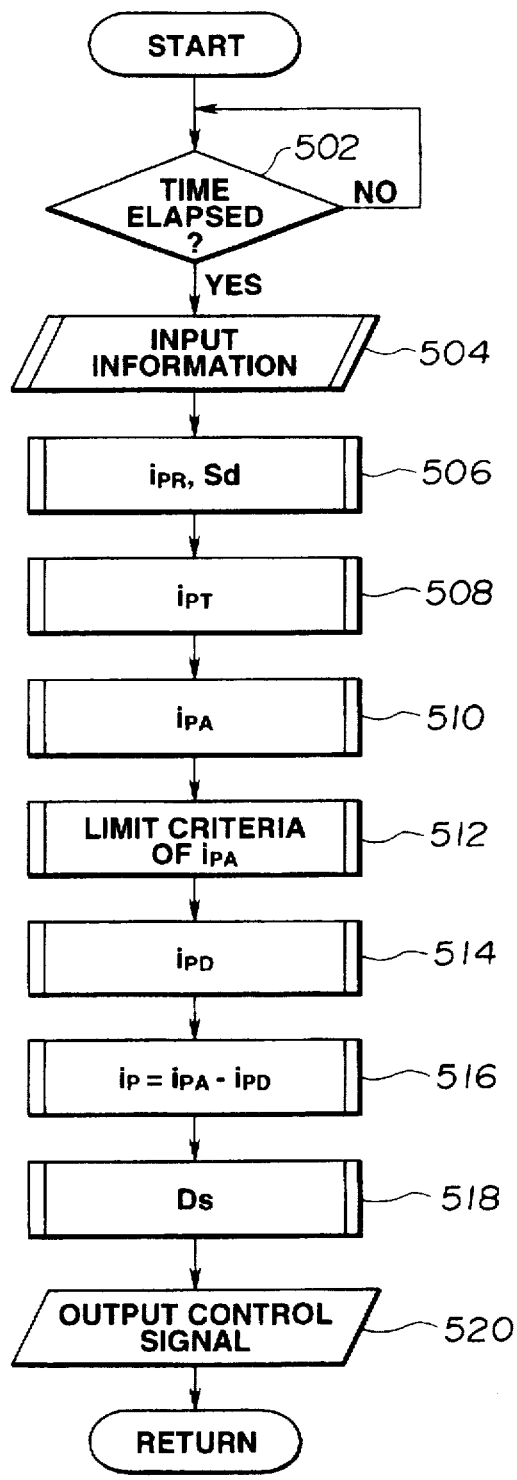
FIG. 9 is a flow chart of a control routine implementing the invention.

The flow chart in FIG. 9 illustrates a control routine of the preferred implementation of the present invention. At box 502, the controller 300 determines whether a predetermined time has elapsed. If this is the case, at box 504, the controller 300 inputs various information carried by the output signals of the sensors 301, 302, 303, 305, 306 and switches 304, 298 and 350. At box 506, the controller 300 computes actual speed ratio $i_{PR}$ and shift direction Sd based on the information as to speeds of input and output shaft to the CVT 29. At box 508, the controller 300 computes target speed ratio $i_{PT}$ based on the input information. At box 510, the controller 300 computes dynamic characteristic compensated speed ratio $i_{PA}$. At box 512, the controller 300 restrains or limits the dynamic characteristic $i_{PA}$ such that $i_{PA}$ is left unaltered if $i_{PA}$ is greater than $i_{PL}$ and less than $i_{PH}$, but, $i_{PA}$ is set equal to $i_{PH}$ if $i_{PA}$ is greater than or equal to $i_{PH}$ and it is set equal to $i_{PL}$ if $i_{PA}$ is less than or equal to $i_{PL}$. At box 514, the controller 300 computes external disturbance compensated speed ratio $i_{PD}$. At box 516, the controller 300 computes speed ratio command $i_P$ by subtracting $i_{PD}$ from $i_{PA}$. At box 518, the controller 300 conducts conversion from speed ratio command $i_P$ to displacement command $D_S$. At box 520, the controller 300 outputs control signal applied to the stepper motor 110.

Figure 10A:
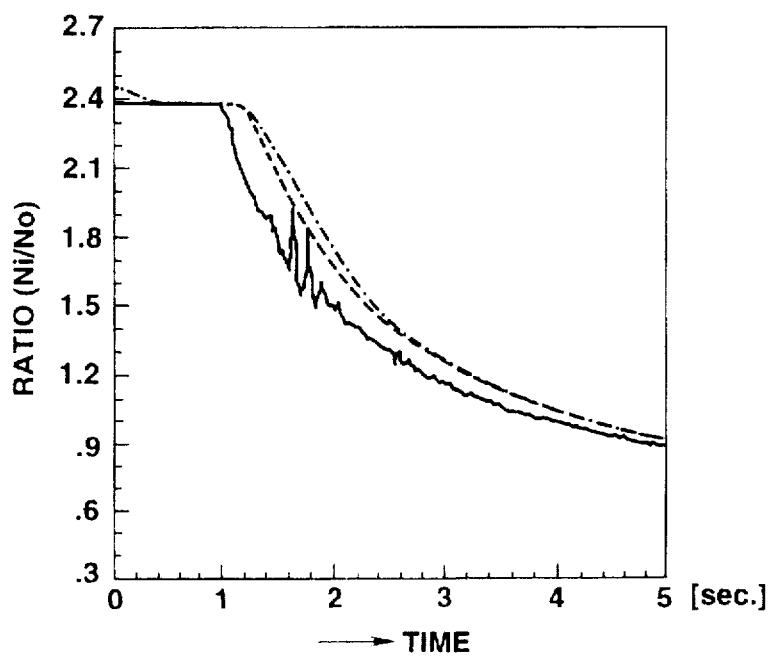
FIG. 10A is a graphical representation illustrating result of simulation to examine ratio response of the previously proposed CVT provided there is a deviation by 5 (five) steps in downshift direction in relationship between the predetermined displacement range of the input element and the predetermined CVT ratio window, wherein the fully drawn line illustrates variation of ratio command ($i_P$), the dotted line illustrates variation of target ratio ($i_{PT}$), and the one-dot chain line illustrates actual ratio ($i_{PR}$)
Figure 10B:
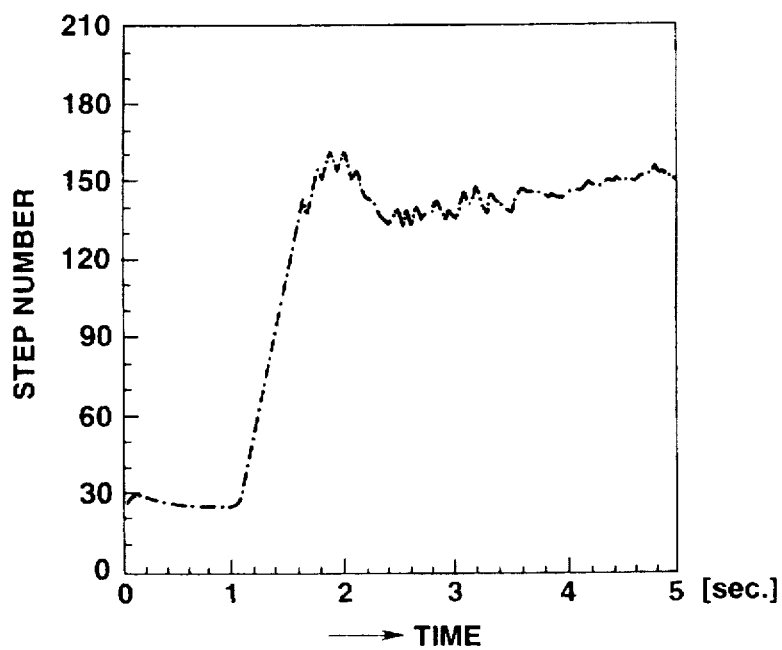
FIG. 10B is a graphical representation illustrating result of the simulation to examine response of stepper motor of the previously proposed CVT provided there is the deviation by 5 (five) steps in downshift direction.
Figure 11A:
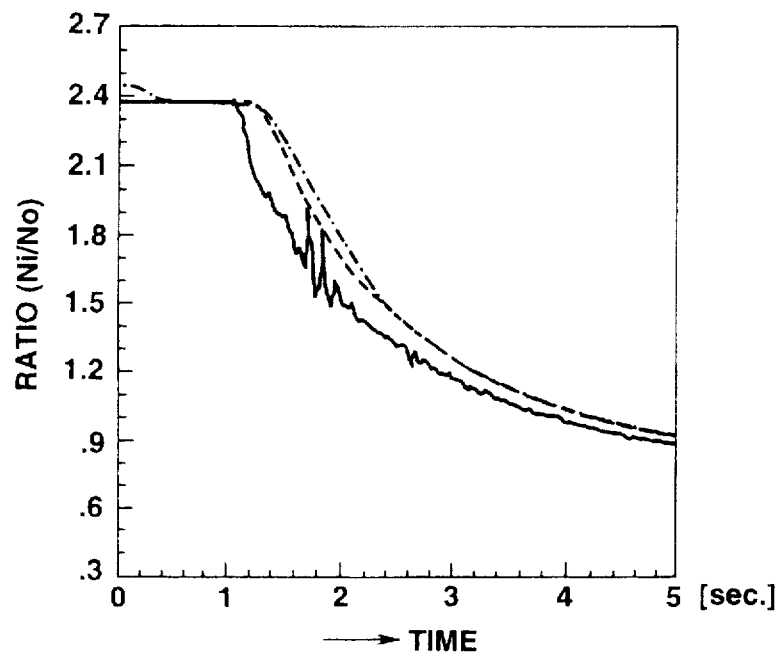
FIG. 11A is a graphical representation illustrating result of simulation to examine ratio response of the CVT according to the invention provided there is the deviation by 5 (five) steps in downshift direction, wherein the fully drawn line illustrates variation of ratio command ($i_P$), the dotted line illustrates variation of target ratio ($i_{PT}$), and the one-dot chain line illustrates actual ratio ($i_{PR}$)
Figure 11B:
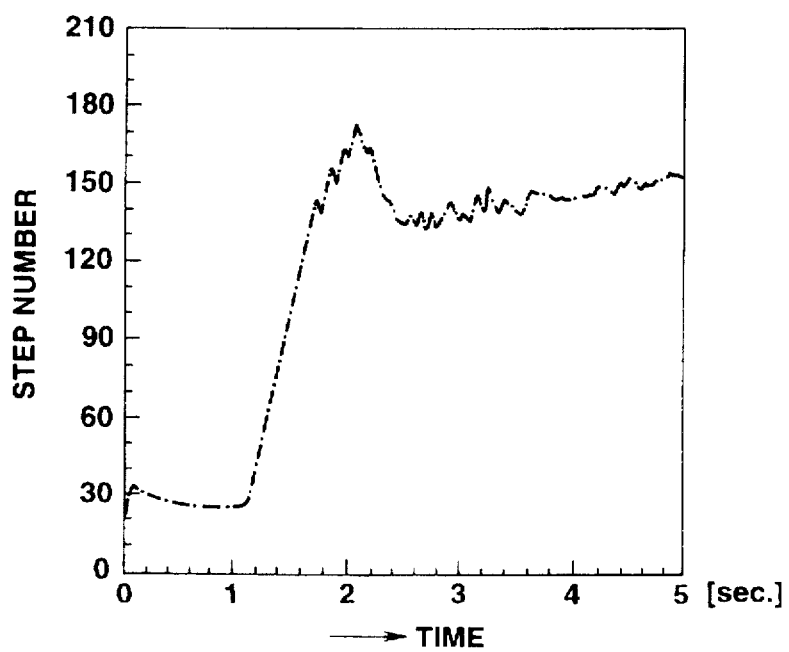
FIG. 11B a graphical representation illustrating result of the simulation to examine response of stepper motor of the CVT according to the invention provided there is the deviation by 5 (five) steps in downshift direction.

Comparing FIGS. 11A and 11B with FIGS. 10A and 10B, respectively, reveals that in both cases correction of the deviation is conducted and the actual speed ratio approaches the target speed ratio quicker according to the present invention from the moment when the vehicle starts moving from a standstill.

Figure 12A:
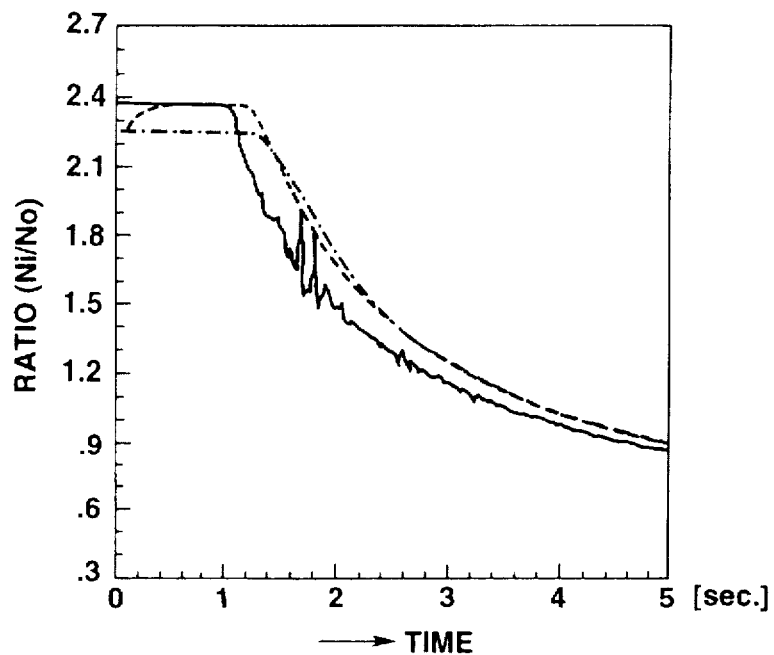
FIG. 12A is a graphical representation illustrating result of simulation to examine ratio response of the previously proposed CVT provided there is a deviation by 5 (five) steps in upshift direction in relationship between the predetermined displacement range of the input element and the predetermined CVT ratio window, wherein the fully drawn line illustrates variation of ratio command ($i_P$), the dotted line illustrates variation of target ratio ($i_{PT}$), and the one-dot chain line illustrates actual ratio ($i_{PR}$)
Figure 12B:
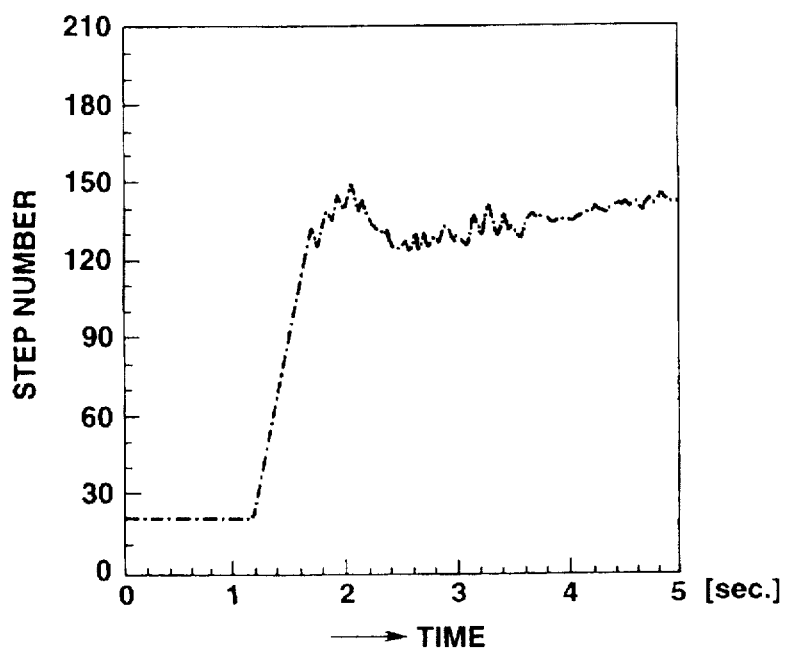
FIG. 12B is a graphical representation illustrating result of the simulation to examine response of stepper motor of the previously proposed CVT provided there is the deviation by 5 (five) steps in upshift direction.
Figure 13A:
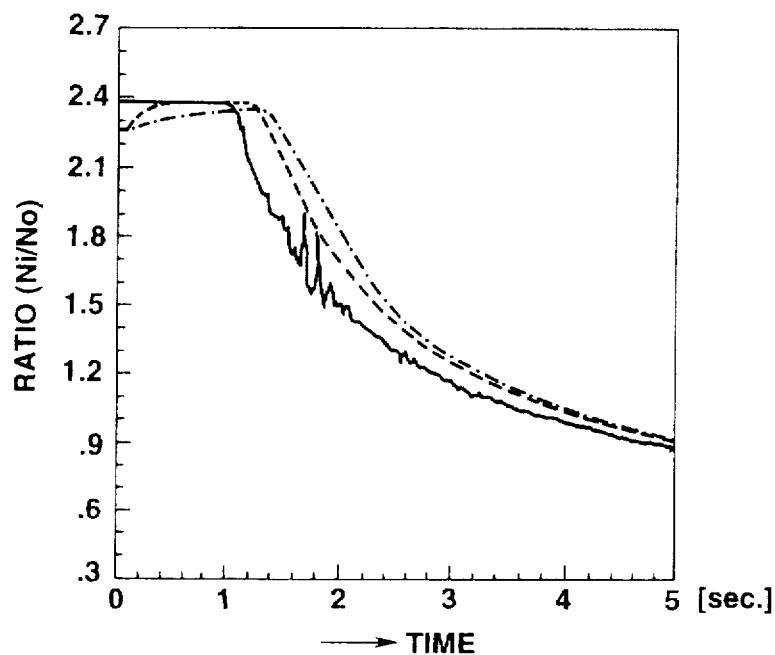
FIG. 13A is a graphical representation illustrating result of simulation to examine ratio response of the CVT according to the invention provided there is the deviation by 5 (five) steps in upshift direction, wherein the fully drawn line illustrates variation of ratio command ($i_P$), the dotted line illustrates variation of target ratio ($i_{PT}$), and the one-dot chain line illustrates actual ratio ($i_{PR}$)
Figure 13B:
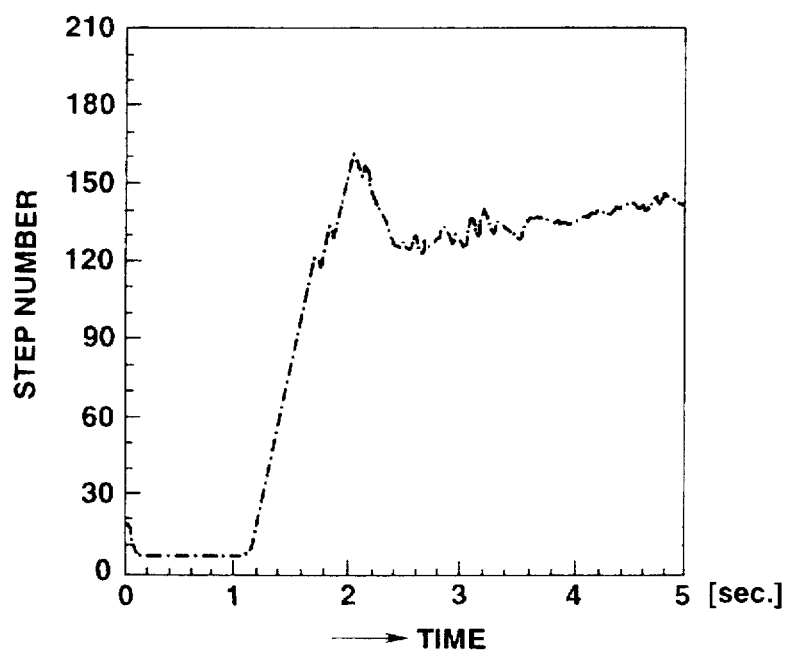
FIG. 13B is a graphical representation illustrating result of the simulation to examine response of stepper motor of the CVT according to the invention provided there is the deviation by 5 (five) steps in upshift direction.

From comparison of FIGS. 13A and 13B with FIGS. 12A and 12B, respectively, it will be noted that correction of the deviation is not conducted in the previously proposed CVT discussed before, while the correction is conducted in the CVT according to the invention.

Figure 14A:
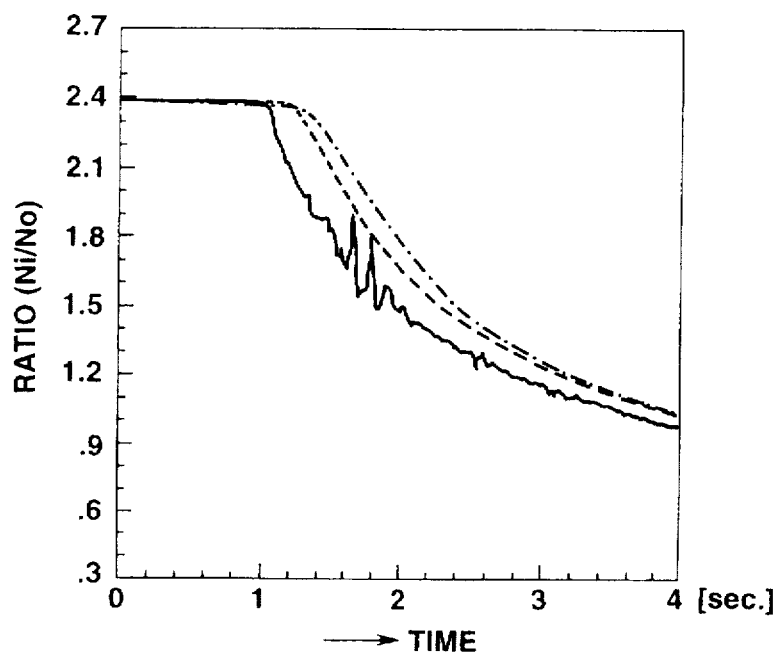
FIG. 14A is a graphical representation illustrating result of simulation to examine ratio response of the CVT according to the invention without dynamic characteristic compensated speed ratio unlimited provided there is a deviation by 5 (five) steps in ramp in relationship between the predetermined displacement range of the input element and the predetermined CVT ratio window, wherein the fully drawn line illustrates variation of ratio command ($i_P$), the dotted line illustrates variation of target ratio ($i_{PT}$), and the one-dot chain line illustrates actual ratio ($i_{PR}$)
Figure 14B:
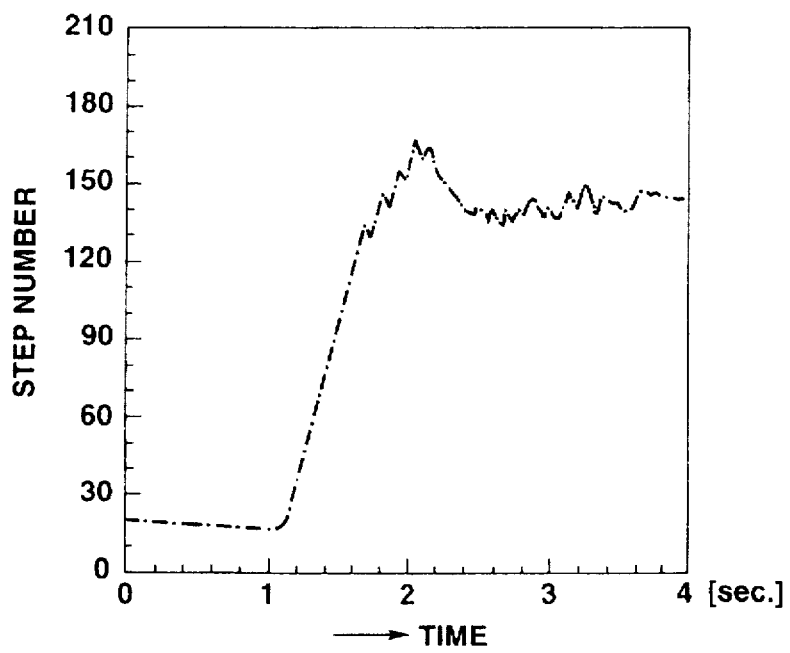
FIG. 14B is a graphical representation illustrating result of the simulation to examine response of stepper motor of the CVT according to the invention with the dynamic characteristic compensated speed ratio unlimited provided there is the deviation by 5 (five) steps in ramp.
Figure 15A:
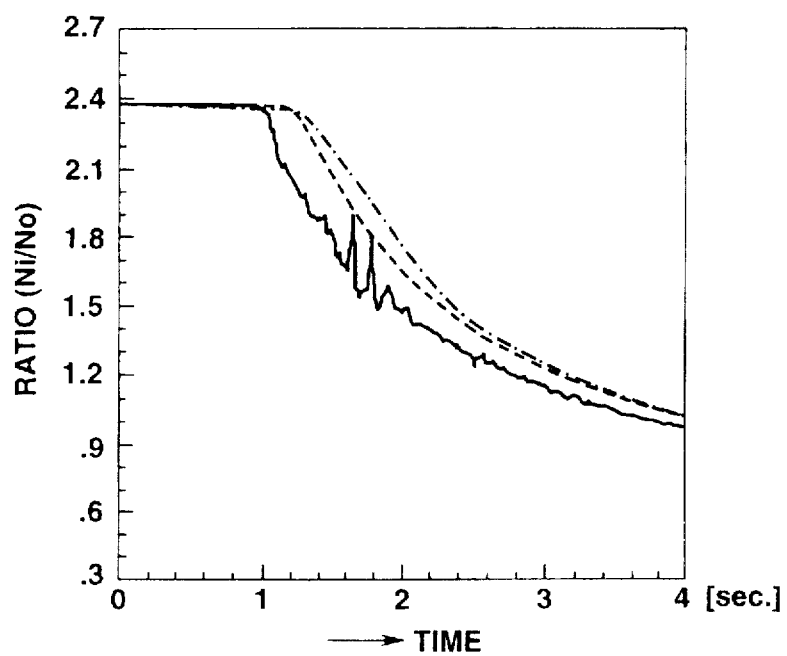
FIG. 15A is a graphical representation illustrating result of simulation to examine ratio response of the CVT according to the invention with the dynamic characteristic compensated speed ratio limited provided there is the deviation by 5 (five) steps in ramp, wherein the fully drawn line illustrates variation of ratio command ($i_P$), the dotted line illustrates variation of target ratio ($i_{PT}$), and the one-dot chain line illustrates actual ratio ($i_{PR}$)
Figure 15B:
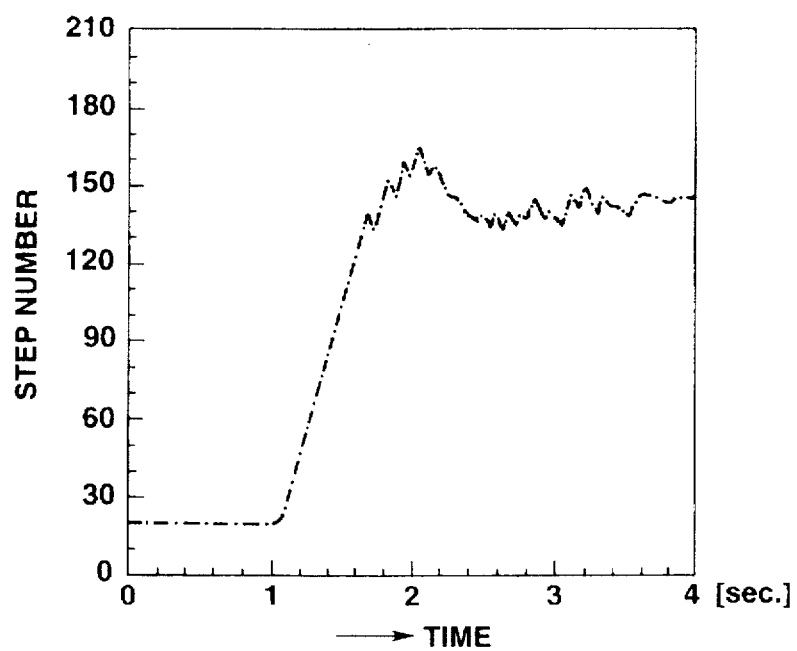
FIG. 15B is a graphical representation illustrating result of the simulation to examine response of stepper motor of the CVT according to the invention with the dynamic characteristic compensated speed ratio limited provided there is the deviation by 5 (five) steps in ramp.

The difference between the case with the limit criteria at box 460 and the case without the limit critera can be examined by comparing FIGS. 15A and 15B with FIGS. 14A and 14B. It will be noted that the convertion of the actual speed ratio to the target speed ratio is slightly improved owing to the addition of the limit criteria of the dynamic characteristic compensated speed ratio $i_{PA}$.

Figure 16:
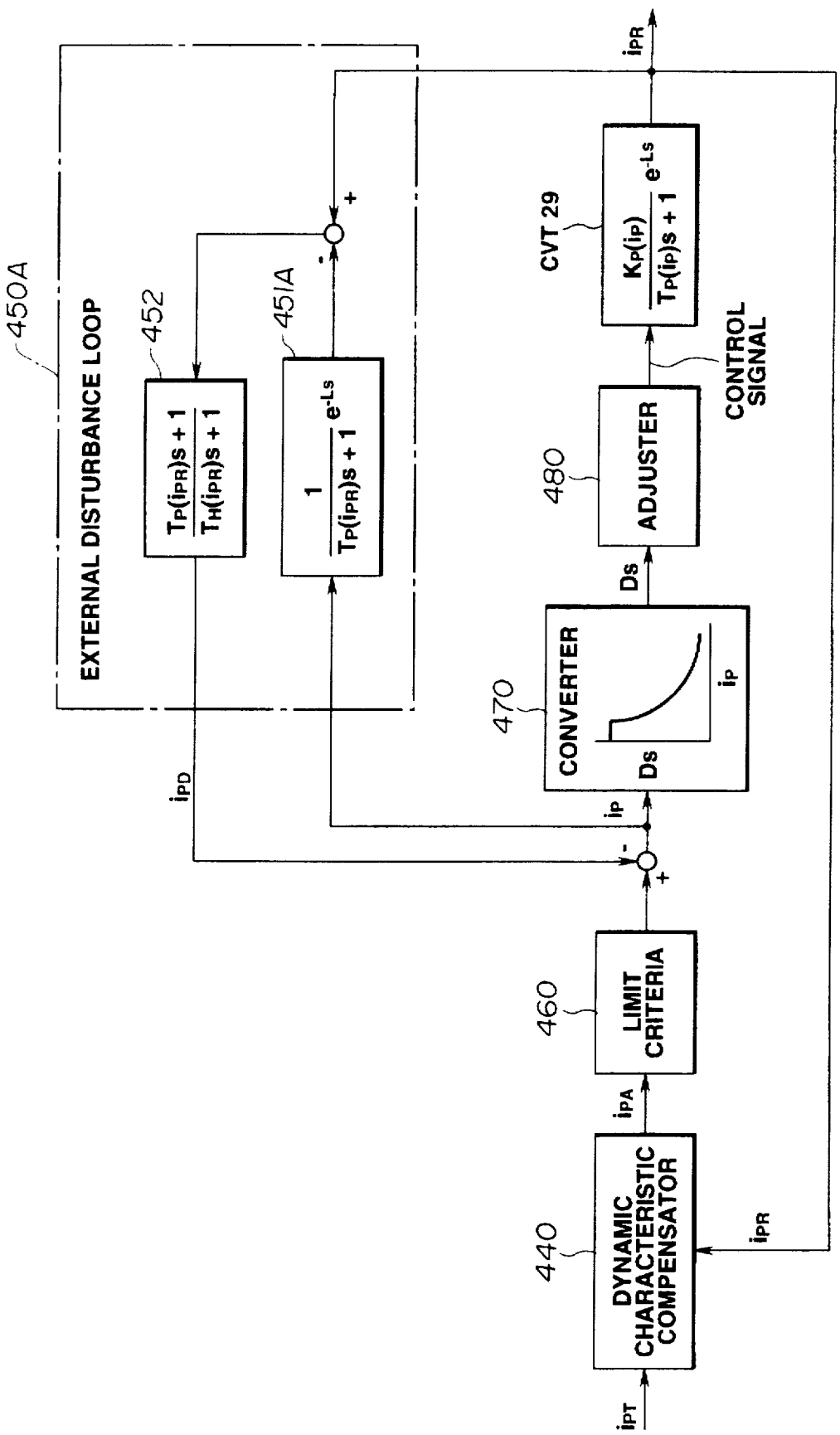
FIG. 16 is a block diagram of a modification of the robust control shown in FIG. 5.

Referring to the modification in FIG. 16, the system is substantially the same as the system in FIG. 5 except the provision of a modified external disturbance compensation loop 450A in lieu of its counterpart 450 in the system of FIG. 5.

This modified disturbance compensation loop 450A employs a first external disturbance compensator whcih is different from its counterpart 451 in FIG. 5 and a second disturbance compensator 452 which is the same as its counterpart 452 in FIG. 5.

A disturbance compensated speed ratio $i_{PD}$ is described as $$i_{PD} = i_{PR}\{\{T_P(i_{PR})s + 1\}/\{T_H(i_{PR})s + 1\}\} - [1/\{T_H(i_{PR})s + 1\}] e^{-L_{1i_P}}. \quad (9)$$

Many modifications to the above described invention will occur to those skilled in the art, and systems incorporating such modifications may fall within the scope of this invention which is defined by the claims below.

What is claimed is:

1. In a drivetrain control system including an engine having various engine speeds, a CVT including a ratio control means having an input element (182) positionable in response to a control signal to establish various speed ratios between input and output shafts of the CVT over a predetermined speed ratio window limited on one hand by a lowest speed ratio and on the other hand by a highest speed ratio, and a controller developing the control signal for positioning the input element, the CVT having various dynamic characteristics for various speed ratios, the improvement wherein:

the controller generates a target speed ratio command ($i_{PT}$);

the controller generates an actual speed ratio ($i_{PR}$);

the controller derives an actual CVT dynamic characteristic constant $\{T_P(i_{PR})\}$ of dynamic characteristic $\{G_P(s)\}$ of the CVT for the actual speed ratio ($i_{PR}$);

the controller derives a target CVT dynamic characteristic constant ($T_T$) of a target dynamic characteristic $\{G_T(s)\}$ of the CVT;

the controller determines a speed ratio command ($i_P$) in response to the target speed ratio command, the actual speed ratio, the actual CVT dynamic characteristic constant $\{T_P(i_{PR})\}$ and the target CVT dynamic characteristic constant ($T_T$);

the controller converts the speed ratio command ($i_P$) into a corresponding one of different displacement commands ($D_S$) of the input element (182) spread continuously over and beyond a predetermined displacement range of the input element (182) which range corresponds to the predetermined speed ratio window; and the controller develops the control signal determined as a function of the displacement command ($D_S$).

2. The improvement as claimed in claim 1, wherein the displacement commands ($D_S$) spread beyond each of limits of the predetermined displacement range by an extended range.

3. The improvement as claimed in claim 1, wherein the controller subtracts a disturbance compensated speed ratio ($i_{PD}$) from a dynamic characteristic compensated speed ratio ($i_{PA}$) to give the speed ratio command ($i_P$).

4. The improvement as claimed in claim 3, wherein the controller compares the speed ratio command ($i_P$) with the predetermined speed ratio window;

the controller converts the speed ratio command ($i_P$) to a corresponding one of the different displacement commands ($D_S$) of which the predetermined displacement range consists when the comparison indicates that the speed ratio command ($i_P$) falls in the predetermined speed ratio window;

the controller determines a displacement command ($D_S$) which is expressed as $$D_S = D_{SH} + (i_P - i_{PL}) \times (D_{SH} - D_{SH-1})/(i_{PL} - i_{PL-1})$$

where:

$D_S$ is displacement command;

$i_{PL}$ is lowest speed ratio command indicative of the lowest speed ratio;

$D_{SH}$ is displacement command corresponding to the lowest speed ratio command $i_{PL}$;

$i_{PL-1}$ is a speed ratio command less than $i_{PL}$;

$D_{SH-1}$ is old displacement command corresponding to the speed ratio command $i_{PL-1}$ when the speed ratio command ($i_P$) is less than the lowest speed ratio command ($i_{PL}$); and the controller determines a displacement command which is expressed as $$D_S = D_{SL} - (i_P - i_{PH}) \times (D_{SL} - D_{SL-1})/(i_{PH} - i_{PH-1})$$

where:

$i_{PH}$ is highest speed ratio command indicative of the highest speed ratio;

$D_{SL}$ is displacement command corresponding to the highest speed ratio command $i_{PH}$;

$i_{PH-1}$ is a speed ratio command greater than $i_{PH}$;

$D_{SL-1}$ is displacement command corresponding to the speed ratio command $i_{PH-1}$ when the speed ratio command ($i_P$) is greater than the highest speed ratio command ($i_{PH}$).

5. The improvement as claimed in claim 4, wherein when the displacement command ($D_S$) is less than a lower displacement command limit ($D_{SLL}$) that is less than the displacement command ($D_{SL}$) corresponding to the lowest speed ratio command ($i_{PL}$), the controller sets the displacement command equal to the lower displacement command limit ($D_{SLL}$); and when the displacement command ($D_S$) is greater than an upper displacement command limit ($D_{SHL}$) that is greater than the displacement command ($D_{SH}$) corresponding to the highest speed ratio command ($i_{PH}$), the controller sets the displacement command equal to the upper displacement command limit ($D_{SHL}$).

6. The improvement as claimed in claim 1, wherein the controller calculates a dynamic characteristic compensated speed ratio $i_{PA}$ which is expressed as $$i_{PA} = [\{T_P(i_{PR})s+1\}/\{T_T s+1\}] i_{PT}$$

where:

$T_P(i_{PR})$ is the actual CVT dynamic characteristic constant in the form of time constant;

s is complex variable of Laplace transform;

$T_T$ is the target CVT dynamic characteristic constant in the form of time constant; and $i_{PT}$ is the target speed ratio command;

the controller restrains the dynamic characteristic compensated speed ratio ($i_{PA}$) by the lower and upper limits which are defined by the following inequaility;

$$i_{PL} \leq i_{PA} \leq i_{PH};$$

the controller calculates a disturbance compensated speed ratio $i_{PD}$ which is expressed as $$i_{PD} = [\{T_P(i_{PR})s + 1\}/\{T_H(i_{PR})s + 1\}]i_{PR} - [1/\{T_H(i_{PR})s + 1\}] e^{-Ls} i_P$$

where:

$T_H(i_{PR})$ is cutoff frequency of low-pass filter; and

L is deadtime; and the controller subtracts the disturbance compensated speed ratio $i_{PD}$ from the restraied dynamic characteristic compensated speed ratio $i_{PA}$ to give the speed ratio command $i_P$.

7. A control method for a vehicle drivetrain including an engine having various engine speeds, a CVT including a ratio control means having an input element (182) positionable in response to a control signal to establish various speed ratios between input and output shafts of the CVT over a predetermined speed ratio window limited on one hand by a lowest speed ratio and on the other hand by a highest speed ratio, and a controller developing the control signal for positioning the input element, the CVT having various dynamic characteristics for various speed ratios, the control method comprising the steps of:

generating a target speed ratio command ($i_{PT}$);

generating an actual speed ratio ($i_{PR}$);

deriving an actual CVT dynamic characteristic constant $\{T_P(i_{PR})\}$ of dynamic characteristic $\{G_P(s)\}$ of the CVT for the actual speed ratio ($i_{PR}$);

deriving a target CVT dynamic characteristic constant $\{T_P(i_{PR})\}$ of a target dynamic characteristic $\{G_T(s)\}$ of the CVT;

determining a speed ratio command ($i_P$) in response to the target speed ratio command, the actual speed ratio, the actual CVT dynamic characteristic constant $\{T_P(i_{PR})\}$ and the target CVT dynamic characteristic constant ($T_T$);

converting the speed ratio command ($i_P$) into a corresponding one of different displacement commands ($D_S$) of the input element (182) which spread continuously over and beyond a predetermined displacement range of the input element (182) which range corresponds to the predetermined speed ratio window;

developing the control signal determined as a function of the displacement command $D_S$); and positioning the input element in response to the control signal.

8. A control method for a vehicle drivetrain including an engine having various engine speeds, a CVT including a ratio control means having an input element (182) positionable in response to a control signal to establish various speed ratios between input and output shafts of the CVT over a predetermined speed ratio window limited on one hand by a lowest speed ratio and on the other hand by a highest speed ratio, and a controller developing the control signal for positioning the input element, the CVT having various dynamic characteristics for various speed ratios, the control method comprising the steps of:

generating a target speed ratio command ($i_{PT}$);

generating an actual speed ratio ($i_{PR}$);

deriving an actual CVT time constant $\{T_P(i_{PR})\}$ of dynamic characteristic $\{G_P(s)\}$ of the CVT for the actual speed ratio ($i_{PR}$);

deriving a target CVT time constant $\{T_P(i_{PR})\}$ of a target dynamic characteristic $\{G_T(s)\}$ of the CVT;

calculating a dynamic characteristic compensated speed ratio $i_{PA}$ which is expressed as $$i_{PA} = \{\{T_P(i_{PR})s+1\}/\{T_T s+1\}\} i_{PT}$$

where:

$T_P(i_{PR})$ is the CVT time constant;

s is complex variable of Laplace transform;

$T_T$ is the target CVT time constant; and $i_{PT}$ is the target speed ratio command;

calculating a disturbance compensated speed ratio $i_{PD}$ which is expressed as $$i_{PD} = \{\{T_P(i_{PR})s + 1\}/\{T_H(i_{PR})s + 1\}\} i_{PR} - [1/\{T_H(i_{PR})s + 1\}] e^{-Ls} i_P$$

where:

$T_H(i_{PR})$ is cutoff frequency of low-pass filter; and

L is deadtime;

subtracting the disturbance compensated speed ratio $i_{PD}$ from the dynamic characteristic compensated speed ratio $i_{PA}$ to give a speed ratio command $i_P$;

converting the speed ratio command ($i_P$) into a corresponding one of different displacement commands ($D_S$) of the input element (182) which spread continuously over and beyond a predetermined displacement range of the input element (182) which range corresponds to the predetermined speed ratio window;

developing the control signal determined as a function of the displacement command ($D_S$); and positioning the input element in response to the control signal.

* * * * *